F. O. FARWELL.
GEAR HOBBING MACHINE.
APPLICATION FILED JUNE 10, 1911.

1,091,493.

Patented Mar. 31, 1914.
6 SHEETS—SHEET 3.

UNITED STATES PATENT OFFICE.

FAY O. FARWELL, OF DUBUQUE, IOWA.

GEAR-HOBBING MACHINE.

1,091,493.  Specification of Letters Patent.  Patented Mar. 31, 1914.

Application filed June 10, 1911. Serial No. 632,395.

*To all whom it may concern:*

Be it known that I, FAY O. FARWELL, a citizen of the United States, and resident of Dubuque, county of Dubuque, and State of Iowa, have invented certain new and useful Improvements in Gear-Hobbing Machines; and I do hereby declare the following to be a full, clear, and exact description of the invention, such as will enable others skilled in the art to which it appertains to make and use the same.

This invention relates to gear hobbing machines for hobbing spur or worm gears, and the primary object of the invention is to provide a machine of simplified construction having improved means to rotate the cutter or hob and the work in unison, without lost motion or springing of the parts such as would result in inaccurate and inferior work. Heretofore much difficulty has been encountered in constructing a mechanism to rotate the cutter and the work in unison, with the cutter sufficiently free from lost motion, in the gearing associated therewith, the total of which lost motion is usually sufficient to contribute considerable looseness to the drive. Another difficulty has been to make the cutter spindle drive sufficiently compact and rigid to prevent lateral vibration of the cutter. In the ordinary machines of this kind the mechanism for driving the hob or cutter spindle has been constituted by gearing housed in the saddle supporting the spindle, which gearing is connected with the main driving shaft through shafts and gearing between the spindle supports and the housing, and extending back into the main housing of the machine. This construction necessitates the extension of the spindle supports out away from the main housing (to permit of the shafts and gears mentioned) to a much greater extent than is conducive to rigidity and compactness. This also necessitates the use of a large number of joints, shafts and gears to connect the hob spindle with the main driving shaft, with a correspondingly large amount of lost motion in the spindle drive.

In the present machine, the spindle drive, instead of passing through the saddle and housing, is located exteriorly of the same, so that I am enabled to place the spindle bearings much closer to the main housing and to communicate motion to the work table and hob spindle by a very few gears, shafts and joints.

Other objects of the invention are to provide improved mechanism for varying the feed speeds; to furnish an improved arrangement and means for setting up the machine; and to improve machines of this general type in numerous minor features, as will hereinafter appear.

In the accompanying drawings, I have shown a preferred embodiment of the invention, but it is to be understood that the machine may be modified in numerous particulars within the limits of the claims without departing from the scope of the invention.

Figure 1:
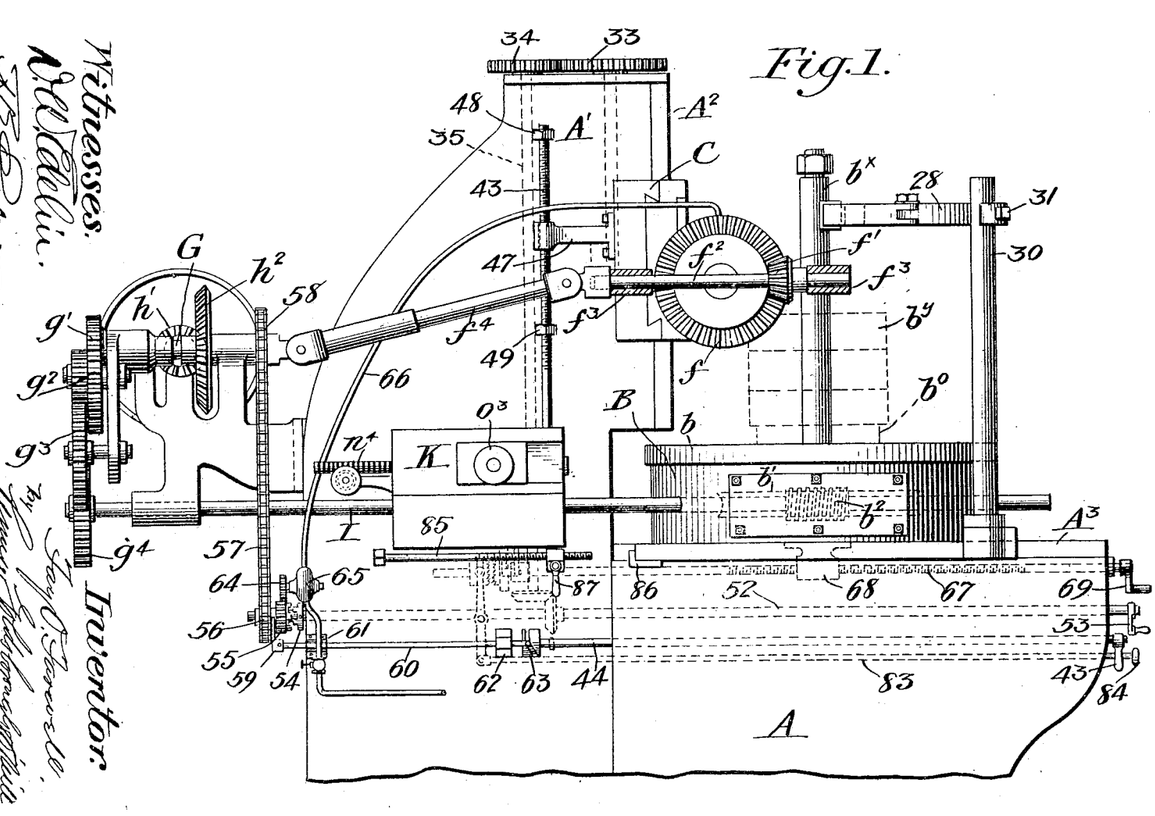
Figure 1 is a partial side elevation, partly in section, of the machine.
Figures 2, 12, 13:
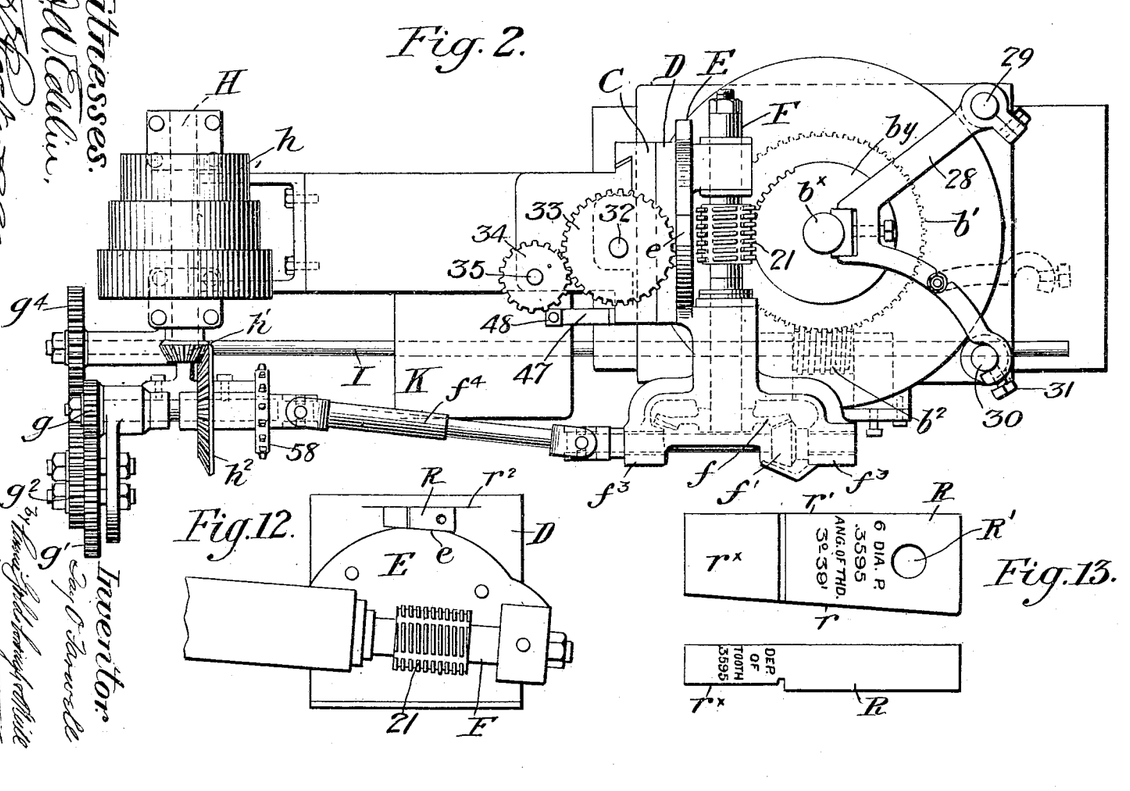
Fig. 2 is a top plan view of the same.
Fig. 12 is a diagrammatic view showing the method of and means for setting the hob at the proper angle, in cutting spur gears.
Fig. 13 shows on a larger scale the gage illustrated in Fig. 12.
Figures 3, 4:
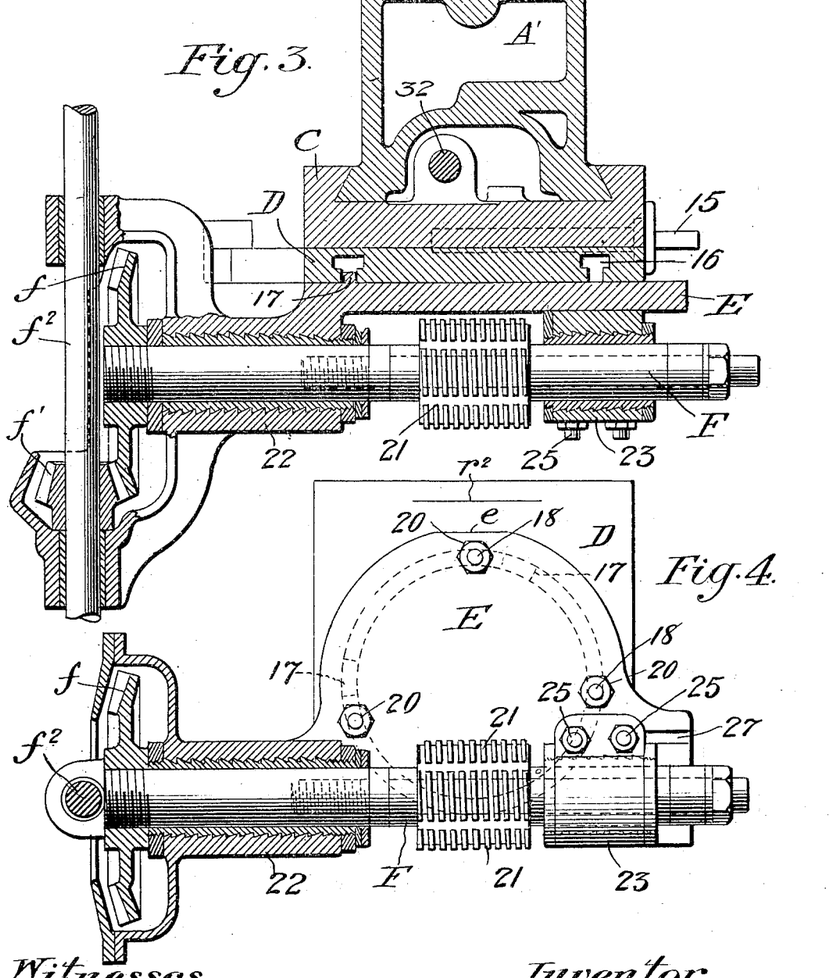
Fig. 3 is a horizontal section through the hob spindle saddle and the adjunctive parts, on an irregular section line.
Fig. 4 is a front elevation, partly in section, of the hob spindle and its saddle.
Figures 5, 6:
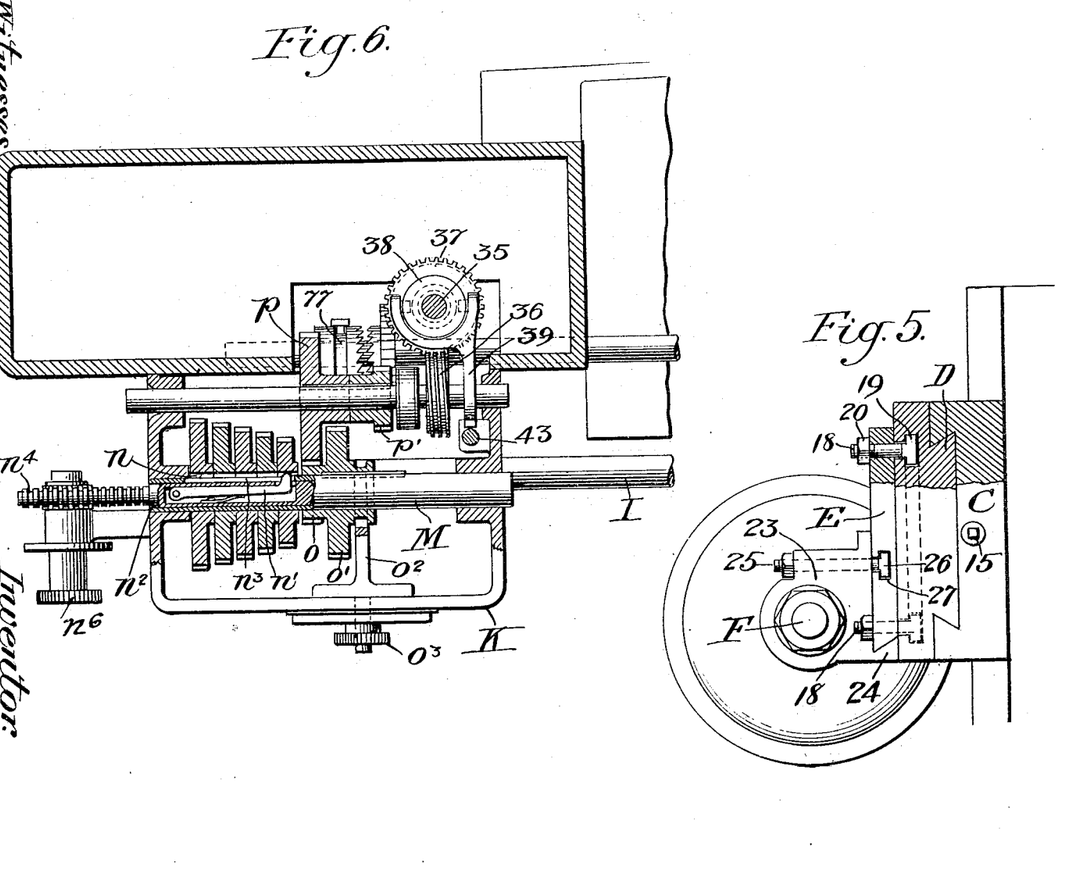
Fig. 5 is a side elevation, partly in section, of the parts shown in Fig. 4.
Fig. 6 is a horizontal section through the gear box.

Referring to the drawings, and particularly to Figs. 1 and 2, the housing A of the machine is shown as provided with an upright standard or housing A', which is provided with a finished vertical surface $A^2$ overhanging a finished horizontal surface $A^3$. On the horizontal portion $A^3$ of the main housing a work holding saddle B is mounted to move toward and away from the vertical surface $A^2$, and on the latter surface is a vertically slidable saddle C. On this saddle is a sub-saddle D on which a plate E carrying the hob spindle F is mounted to turn in a vertical plane. The hob spindle F is driven by means of a bevel gear $f$ on one end of the same meshing with a bevel pinion $f'$ on a stub shaft $f^2$ extending alongside the saddle at the exterior thereof and supported in suitable bearings such as indicated at $f^3$. The stub shaft $f^2$ is driven by means of a universally jointed telescoping shaft $f^4$, operated from a main drive shaft G, rotated by a stub shaft H having a bank of pulleys $h$ and equipped with a bevel pinion $h'$ meshing with a second bevel pinion $h^2$ on the shaft G. The shaft G therefore serves to drive the hob spindle, and it further serves to rotate the work table $b$ associated with the work saddle B. The work table $b$ carries a worm wheel $b'$ in mesh with a worm $b^2$ on a drive shaft I which is driven from the main driving shaft G through the gears $g$, $g'$, $g^2$, $g^3$, $g^4$. The number and arrangement of these last named gears, may, however, be varied, as desired. Thus it will be evident that the shaft G can be considered the starting point for the application of motion to both the acting element of the machine and the element acted upon, and that the number of transmitting devices between said shaft and said elements is reduced to a minimum, with a consequent decrease in the lost motion. Of course any looseness in the bevel gears $h'$, $h^2$ will not affect the results, as will be understood. It will also be noted that the hob supports are at a minimum distance from the main housing A of the machine, wherefore the construction is rendered rigid and compact. The sub-saddle D of the cutting mechanism may be adjusted laterally in the saddle C, in which the same moves in a dove-tail guide-way, by means of any suitable mechanism which may include a spindle 15 (Figs. 3 and 5) on which an ordinary operating crank may be placed. The sub-saddle D is provided with a substantially circular groove 16 on its front face, which groove is of approximately T-shape section. The hob-carrying plate E is provided at its rear face with lugs 17 which extend into the groove 16 as indicated in Figs. 3 and 4, whereby said plate is mounted for turning movement on the sub-saddle in a vertical plane. Such a movement of the plate will tilt the hob to the required angle with respect to the vertical when it is desired to cut spur gears, and the plate is held to the sub-saddle and secured thereon in the desired adjustment by means of bolts 18 having T-shaped heads 19 (Fig. 5) fitting in the widened portion of the groove 16 and equipped at their forward ends with clamping nuts 20.

Figure 7:
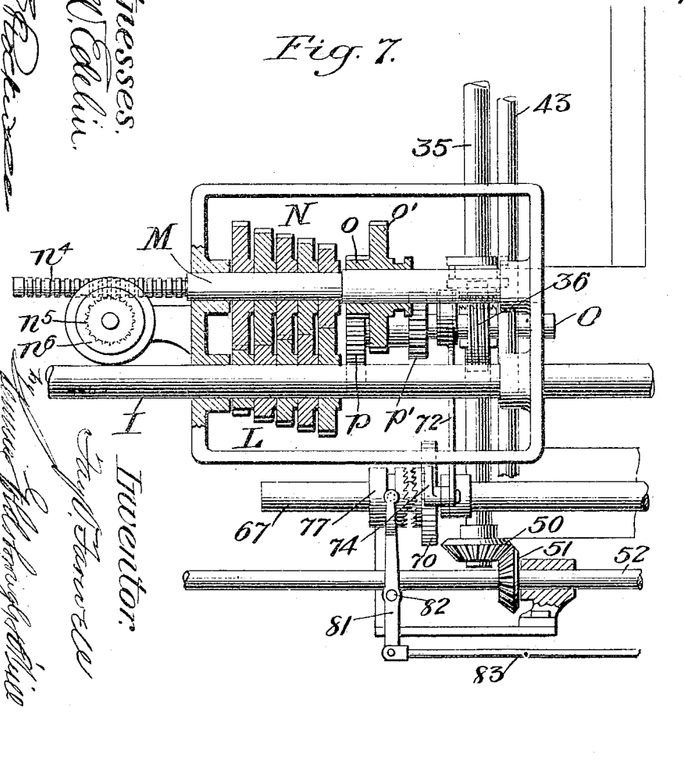
Fig. 7 is a fragmentary side elevation, partly in section, of the gear box and the adjacent mechanism.
Figure 8:
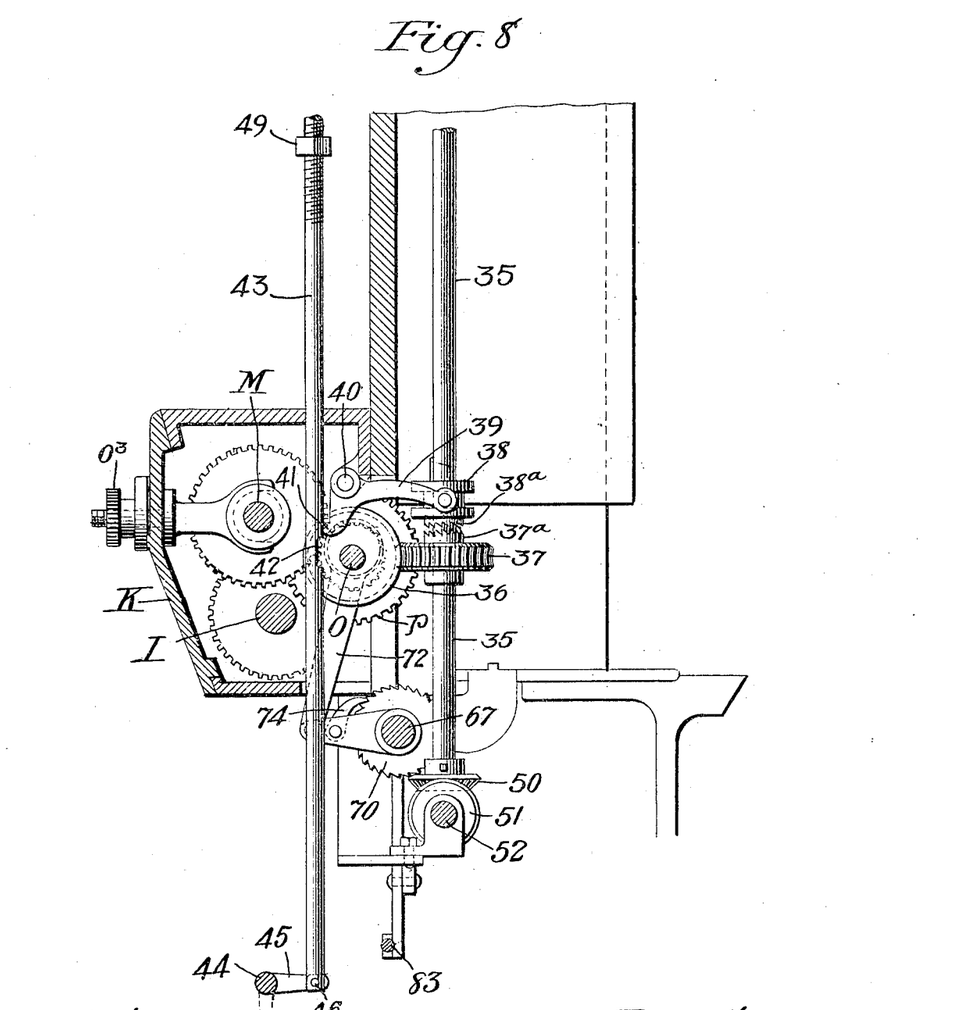
Fig. 8 is a vertical transverse section through the gear box and its associated mechanism.

Figs. 2, 3 and 4 show a hob 21 mounted on the hob spindle F between a fixed bracket 22 on the plate E, and a removable bracket 23 at the opposite side of said plate. The bracket 23 is provided at its lower part with a dove-tail ledge 24 extending around the correspondingly shaped lower edge of the spindle plate, (Figs. 4 and 5) and at its upper part said bracket is traversed by nutted bolts 25 having T-heads 26 engaging a groove 27 in the plate arranged parallel to the spindle. By this arrangement the bracket 24 is held to the spindle plate by screwing up the nuts on the bolts 25, and if it is desired to remove the hob, it is simply necessary to loosen said nuts and slide the bracket off the plate, the end of groove 27 being left open for this purpose. The spur gear blanks to be operated upon by the hob 21 are centered on the work table $b$ by means of an upright arbor $b^x$, as indicated in Figs. 1 and 2. In Fig. 2 the top blank is shown at $b^y$, and it is illustrated as in the process of being cut. The blanks are preferably supported on the table from beneath by means of one or more blocks or rings $b^0$, as shown in Fig. 1. When the work is heavy it is desirable to support the work arbor $b^x$ at the top by means such as a support 28. This is preferably constituted by a V-shaped device swiveled on an upright rod 29 at one side of the machine and adapted to be swung with its intermediate portion against the upper end of the work arbor, in which position the free end of said device may be clamped to an upright rod 30, which it partially embraces, by a set screw 31. The upright rods 29, 30 thereby firmly hold the arbor support against displacement away from the cutter, and the work is made very accurate. When the blanks are finished they can be removed easily from the arbor after the support 28 is swung away from the arbor on its pivot rod 29, the set screw 31 being first loosened. The hob saddle C is moved up and down on the surface $A^2$ by means of an ordinary threaded spindle 32 housed in the part A'. On top of spindle 32 is a spur gear 33 meshing with a spur gear 34 at the top of a shaft 35 also housed in the part A'. This shaft 35 is rotated from the driving shaft I of the work table by means of change speed mechanism located in a casing K on the side of the machine. The rapidity with which the hob is fed downward across the gear blanks depends upon the size of the latter and the material of which they are made, and the change speed mechanism insures a proper feeding movement of the hob saddle under any given conditions. In the embodiment illustrated, the change speed mechanism is constructed substantially as follows: The work table shaft I extends through the bottom of the gear box or casing K, as best shown in Figs. 7 and 8. Within said casing this shaft has keyed to it a bank of gears denoted generally by reference character L. Journaled in the casing or box above the shaft I is a short shaft M. On the shaft M is a bank of gears N adapted to coöperate with the bank L in transmitting movement from shaft I to shaft M, at any of a number of speeds. In the embodiment shown, each bank of gears consists of five wheels, so that five speeds may be provided. The gears of the bank N are loose on the shaft M, but any one of them is adapted to be locked to said shaft in order to be thereby brought into operative connection with the corresponding gear on shaft L, by means such as are common in lathes and similar machines. This means may be of any appropriate character, but in the machine illustrated, the central openings of the gears N are grooved, as indicated at $n$, and adapted to be engaged by a spring pressed finger $n'$ housed in a cut-out shaft $n^2$ adapted to be moved into and out of an open space in shaft M, which has a slot $n^3$ through which the end of the finger $n'$ projects to lock the gear alined therewith. The outer end of shaft $n^2$ is formed as a circular rack $n^4$ with which coacts a pinion $n^5$ operated by a knob $n^6$. By turning this knob the shaft $n^4$ may be moved in and out with respect to shaft M, so that the finger $n'$ can be engaged with the desired gear of bank N, to place that gear in operation. From shaft M motion is transmitted to a third shaft O in the gear box. Shaft M has keyed thereon, but slidable lengthwise thereof, two gears $o$, $o'$ arranged side by side and preferably integral with each other. These gears, of which $o$ is the smaller, are shiftable lengthwise on their shaft by means of a fork $o^2$ operated by a knob $o^3$ at the exterior of the gear box. When the parts are in the position shown in Fig. 6, the small gear $o$ is in mesh with a large gear $p$ on shaft O, but when the large gear $o'$ is shifted by the knob $o^3$ to the right with respect to Fig. 6, it can be engaged with a small gear $p'$ on shaft O, whereby the speed imparted to the last named shaft can be materially increased. Thus it will be seen that five additional speeds are provided, one for each position of the gear banks L, N. The arrangement is preferably such that the fastest speed when gears $o$, $p$ are intermeshed is not quite as fast as the slowest speed when the gears $o'$, $p'$ are in mesh with each other. The shaft O, which can, as indicated, be driven at any of ten speeds, has keyed thereon a worm 36 which meshes with a worm gear 37 loosely rotatable on the shaft 35 hereinbefore described. By coupling the worm gear 37 to the shaft 35 the latter may be operated at any of ten speeds, and this may be accomplished by means of a collar 38 on said shaft, which collar is slidable on the shaft along a key which prevents its rotation on the shaft. The collar 38 and worm gear 37 are formed with coacting toothed faces 38$^a$, 37$^a$ forming parts of a clutch. The collar or clutch member 38 can be raised and lowered by means of a bell crank lever 39 pivoted at 40 and provided with a terminal lug 41 adapted to take into a cut-away portion or recess 42 in an upright rod 43 movable vertically in the gear box K. When the parts are in the position shown in Fig. 8, the abutment of the lug 41 of lever 39 against the solid portion of rod 43 above the recess 42 will hold the clutch member 38 in its raised or disengaged position, so that the rotation of shaft O will not affect the saddle driving shaft 35, but if the rod 43 is raised from the position shown the lug 41 will take into the recess 42 and thereby permit clutch member 38 to drop by gravity into engagement with the clutch face on the worm gear 37. The shaft 35 will then be rotated at a speed corresponding to that of the shaft O. The clutch operating rod 43 may be operated by hand by means of a small lever 43$^a$ at the front of the machine, which lever is mounted on a rod 44 extending lengthwise of the machine and equipped with a small lever 45 pivoted at 46 to the lower end of the rod 43, as shown in Fig. 8. The saddle C carries a bracket 47 which loosely surrounds the rod 43 and is adapted to coact with upper and lower nuts 48, 49 threaded on said rod above and below said bracket. In this manner, the saddle C may operate the rod 43 automatically in order to start and discontinue the downward feed of the saddle at the desired points, as will hereinafter appear. In order to permit the saddle C to be raised and lowered by hand, and to be raised rapidly by power after the cut has been completed, the shaft 35 is continued downward beyond worm gear 37, and it is provided at its lower end with a bevel gear 50 meshing with a bevel gear 51 on a shaft 52 extending throughout the length of the machine, within the housing. At the front of the machine this shaft is provided with an operating lever 53. At the rear of the machine, the shaft 52 has keyed thereon a clutch member 54 with which coacts a wide gear 55 loose on the shaft 52 and having a clutch face to coact with that of the member 54. The gear 55 is solid with a sprocket 56 driven by an endless chain 57 running over a sprocket 58 on the main driving shaft G, and the gear 55 and sprocket 56 are movable along the shaft 52 into a position in which the two clutch faces are engaged, whereupon the shaft 52 will be rotated by the chain and sprocket transmission described. The sliding movement of gear 55 to produce this result is effected by means of a fork 59 on a rod 60 mounted in brackets 61, 62 on the machine housing and having its forward end engaged with a cam 63 secured to the rear end of the rod 44 for operating the clutch of the vertical saddle. The gear 55 is continuously rotated from the main driving shaft, and in all of its positions it is engaged with a gear 64 on the shaft of a small lubricating pump 65, which supplies oil to the hob through a tube 66, said pump being therefore continuously operated. It will now be understood that when, in feeding downward, the vertical saddle C reaches what should be its downward limit of movement, the bracket 47 on said saddle will engage and depress the lower nut 49 on the rod 43, which nut has previously been set in the desired position. The rod 43 will thereby be depressed and the clutch member 38 disengaged from the worm wheel 37, so that the downward feed of the saddle will be arrested by the discontinuance of the rotation of shaft 35. At the same time, the depression of rod 43 will cause the turning of rod 44 by means of the lever 45, and this will result in such an actuation of the cam 63 as to pull forward the rod 60 and thereby engage the gear 55 with the clutch member 54. As the gear 55 is rotated continuously throughout the operation of the machine, as above described, it will thus, when engaged with clutch member 54, rotate the shaft 52 in such a direction that by means of the intermeshing bevel gears 50, 51, the shaft 35 will be rotated in a direction opposite to the initial direction. The vertical return movement of the saddle C will thus be produced automatically by power, and it will be noted that the arrangement is such as to produce this power return at a comparatively high speed, considerably exceeding that of the downward feed. When, in rising, the bracket 47 on the saddle abuts the upper nut 48 on the rod 43, which nut has first been set in the desired position, the rod 43 is raised again, thereby disengaging the clutch 54, 55. The clutch 37, 38 is reëngaged by hand after a new set of blanks is placed in the machine.

The two clutches above mentioned, forming part of the mechanism for raising and lowering the saddle may be operated by hand if desired by means of the lever 43 on the rod 44, which is suitably turned to effect the desired movements of the lever 45 and cam 63. The saddle may be raised and lowered by hand by means of the lever 53 on the shaft 52.

From the foregoing, the operation of cutting spur gears will no doubt be readily understood. The manner of mounting the gear blanks and of rotating the same and the cutter in unison has already been described. The gear $g^4$ of the train connecting the main driving shaft G with the work table shaft I must have a number of teeth corresponding with the number of teeth to be cut in the blank, and said gear is readily removable for the substitution of other gears, as the size of the blanks is changed. As previously intimated, the train of gears just mentioned may consist of different numbers of gears, as required by convenience and the conditions of actual practice. The specific manner of mounting these gears is also immaterial to the invention, and for that reason it has not been described in detail.

The hob spindle is so adjusted, in cutting spur gears, as to have its spiral cutting teeth in parallelism with the vertical axis of the work, and this is effected by the adjustment of the plate E in the manner previously described. In order to set the hob with great accuracy, a gage R is employed, as indicated in Figs. 12 and 13. This gage consists of a metal piece or block having a sloping or inclined edge $r$, the inclination of which corresponds with the angle of the hob thread in any given case. That is to say, a number of such gages are employed corresponding to the different angles of the different hob threads. The inclined edge $r$ of the gage is placed against a flattened surface $e$ at the top of the plate E, as shown in Fig. 12, and the plate is then turned about its axis until the straight side $r$ of the gage registers with a straight mark or incision $r^2$ on the sub-saddle D. The plate is then clamped tightly to the sub-saddle in the required adjustment, as previously described, and the hob will be found to be positioned with great accuracy. This arrangement presents a distinct advantage over that adopted in the ordinary gear hobbing machines, in which the setting of the angle of the hob is effected by means of a protractor or graduations on the swivel head. As the angle is often expressed in seconds as well as degrees and minutes, the protractor is unreliable as seconds cannot be read on a protractor of small diameter. The improved system herein described entirely eliminates, however, this disadvantage and makes the accurate setting of the hob a comparatively easy matter. The gages R may also be used to serve an additional function, as will hereinafter appear. Preferably each gage is provided with a hole R' in the body thereof, so that the same may be conveniently carried on a ring, suspended on a hook or for analogous purposes.

Figures 9, 10, 11:
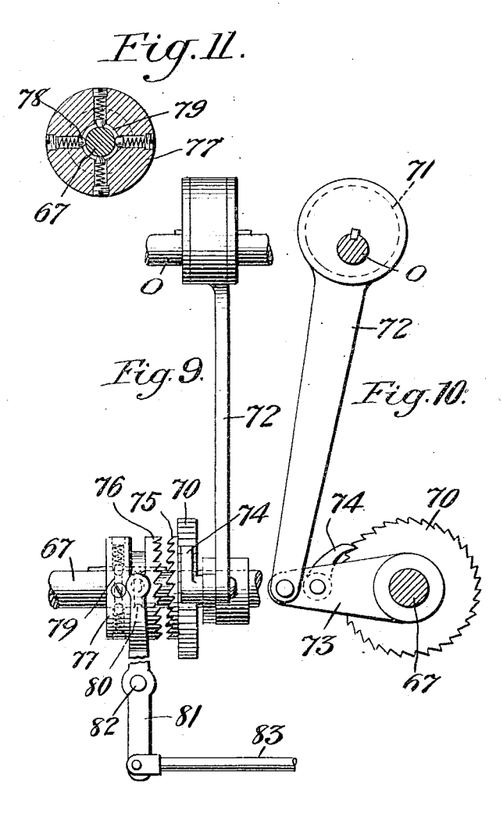
Figs. 9, 10 and 11 are detail views of the mechanism for feeding the work table toward the cutter in cutting worm gears.

When cutting worm gears, the hob has its axis located perpendicular to the plane of the vertical axis of the work. It is not moved vertically during the cutting operation, as with spur gears, but it is set centrally with respect to the worm wheel blank and the table is fed toward the hob until the blank is cut to the proper depth. The saddle B which supports the work table $b$ is moved along the horizontal surface or slide $A^3$ of the machine by means of a screw 67 engaging a threaded lug or nut 68 on the lower part of the saddle within the housing. A crank 69 on the forward end of the screw spindle 67 enables the saddle to be moved toward and away from the cutter by hand. The screw spindle 67 is extended well back into the housing of the machine, where it is suitably supported, and adjacent its inner end it has freely rotatable thereon a ratchet wheel 70 (Figs. 7, 9 and 10) continuously driven from the shaft O in the gear box K. Said ratchet may therefore be driven at any one of the ten feed speeds previously mentioned. The connection between the shaft O and the ratchet 70 comprises an eccentric 71 keyed to the shaft O and adapted to reciprocate a rod 72 pivoted to a short lever 73 carrying a pawl 74 coacting with the ratchet teeth, as best shown in Fig. 10. The ratchet 70 is provided at one side with a clutch face 75 formed of a series of angular projections adapted to engage similar projections on a clutch face 76 with which a sliding clutch member 77 on the shaft 67 is provided. The clutch member 77 is keyed against rotation on the shaft 67, but is slidable along its key, so that the clutch faces 75 and 76 may be engaged to rotate shaft 67 from the shaft O. The clutch member 77 is provided with a plurality of interior spring-pressed balls or pieces 78 (Fig. 11) adapted to rest in either of two grooves 79, 80 cut transversely in the shaft 67, so that when said clutch member is set with its balls or pieces 78 in one of said grooves, such member may not be displaced from that position without the expenditure of a fair amount of force. The clutch member 77 may be clutched into engagement with the ratchet 70 by means of a forked member 81 embracing said clutch member and pivoted to the machine frame at 82. This forked member 81 is provided with a rod 83 extending to the forward end of the machine, where it is equipped with an operating knob 84. With the described arrangement, the clutch members aforesaid may be engaged by pushing on the knob 84. Then if the machine is in operation with the shaft rotating at the desired speed, a proper movement of rotation will be transmitted to the work saddle spindle 67, which will thereby be fed against the cutter or hob, at the proper speed, while the work table b rotates. In order to stop the work saddle at the proper point I employ a stop screw 85 which may be conveniently positioned on the housing beneath the gear box and which has a hardened end to coact with a hardened plug 86, secured to the inner portion of the work saddle base. The stop screw 85 may be fixed in the desired position by means of a lever operated set screw 87, as shown in Fig. 1. When the hardened plug 86 on the saddle abuts the end of the stop screw 85, the resistance to the rotation of the saddle spindle 67 will be such as to cause the clutch members 75 and 76 to disengage themselves automatically. This is produced primarily by the angle of the operating teeth of the clutch members which, under the conditions described, will cause the clutch member 77 to be thrust away from clutch member 70 in spite of the engagement of the balls or pieces 78 in the groove 80 of shaft 67. The clutch member 77 will therefore be pushed to the left with respect to Fig. 9 until it takes the position shown in that figure, wherein the spring-pressed balls or pieces 78 are engaged with the groove 79. It will therefore be understood that when the clutch members 70, 77 are engaged by operation of the knob 84, the clutch members will be held together with sufficient firmness and rigidity, by the frictional means described, to produce the rotation of spindle 67 and the feeding of the work table in a reliable fashion until said table engages the stop screw 85, whereupon the feed is immediately discontinued in a reliable and automatic manner.

The gage R previously described may be used to great advantage to facilitate the setting of the stop screw 85. A separate gage is provided for each gear pitch. The gage shown is, say, for use with six pitch gears. The end portion $r^x$ is therefore in this case equal in thickness to the depth of a six pitch tooth, which is .3595″. In using the gage an accurately sized gear blank is placed upon the arbor and the table is advanced until the hob just touches the blank. The stop screw 85 is then tightened up against the end $r^x$ of the gage, which is interposed between said screw and the hardened plug 86 on the work saddle. The gage is then withdrawn, the hob raised and the table advanced as far as the stop screw will permit, in the manner previously indicated. This will insure the cutting of the teeth exactly .3595″ deep, without liability of error. The use of the gage for the two purposes indicated, is therefore of considerable importance in a convenient and accurate operation of the machine. It will be understood that the gage may also be used in setting up the work saddle in cutting spur gears. In this case, as is well understood, the work saddle is so fixed in position that the hob, in being fed downward across the several blanks which may be cut simultaneously under these conditions, begins and continues to cut to the full depth required.

What I claim is:—

1. In a gear hobbing machine, a vertically slidable hob saddle, a hob spindle carried thereby, a main driving shaft, means to transmit motion from said shaft to said saddle, a rod provided with shoulders adapted to be engaged by said saddle in its movement to raise or lower the rod, said rod provided with a recess, a trigger adapted to be actuated by said recess, and a clutch adapted to be operated by said trigger to control the movement of said saddle.

2. In a gear hobbing machine, a hob saddle mounted for vertical movement, a hob spindle carried by said saddle, a horizontal work table, a main driving shaft, means to impart motion from said shaft to the saddle, and means comprising a universal stub shaft to impart motion to the spindle, means to impart a rotary motion to said table, means to trip the vertical movement of said hob saddle comprising a rod actuated by said saddle, said rod provided with a recess, a trigger adapted to be actuated by said recess, and a clutch mechanism adapted to be operated by said trigger.

3. In a gear hobbing machine, a vertically movable hob saddle, a hob spindle carried thereon, a rotatable work table, a main driving shaft, means to impart motion from said shaft to the hob saddle comprising a change speed mechanism, a vertical shaft, a worm driven by the change speed mechanism to operate said vertical shaft, a clutch mechanism disposed on said vertical shaft, a rod actuated by the hob saddle in its movement, said rod provided with a recess, a trip lever adapted to be actuated by said recess, said lever adapted to operate said clutch mechanism to control the movement of said hob saddle, means to rotate the work table, and means comprising a universal stub shaft driven by the main shaft to rotate said hob spindle.

4. In a gear hobbing mechanism, a vertically movable hob saddle, a spindle on said saddle, a rotatable and sliding work table, means to operate said saddle and said spindle, means to rotate said table, and means to feed said table toward said hob saddle, said means comprising a screw shaft, a clutch keyed to said shaft, a ratchet loosely mounted on said shaft, an eccentric bushing adapted to continually rotate said ratchet, and means to operate said clutch to cause the ratchet wheel to operate the screw shaft thereby feeding the work table as aforesaid.

5. In a gear hobbing machine, the combination of a supporting member, a plate swiveled thereon and carrying a hob spindle, said plate having a flattened edge, and a gage piece having a tapering side to abut said flattened edge and adapted to register with a suitable mark on the supporting member.

6. In a gear hobbing machine, the combination of a supporting member, a plate swiveled thereon and carrying a hob spindle, said plate having a flattened edge, a work saddle, means to move said work saddle toward said cutting mechanism, a hardened plug on the saddle, a longitudinally adjustable stop screw to abut said hardened plug and a gage having a tooth depth determining portion adapted to be interposed between said plug and said screws, and a plate positioning portion having a tapering side to abut said flattened edge of the plate and adapted to register at its other side with a suitable mark on the supporting member.

7. In a gear hobbing machine, the combination of a swiveled plate carrying a hob saddle, a work saddle movable toward and away from said spindle, and a gage having one portion which coöperates with said plate to indicate the adjustment of the same, and another portion which indicates the proper adjustment of the movement of the work saddle.

8. In a gear hobbing machine, the combination of a swiveled plate carrying a hob saddle, a work saddle movable toward and away from said spindle, and a gage having a tooth depth determining portion and a plate positioning portion, said first named portion having a cut out part which determines the amount of movement of said work saddle and said last named portion having a tapering side to determine the angular position of said plate.

9. In a gear hobbing machine, a vertically movable hob saddle, an actuating shaft therefor, a gear loosely mounted on said shaft, clutch mechanism to operatively connect said gear and shaft, a rod actuated by said hob saddle in its movement, said rod provided with a recess, and a trip lever actuated by said recess, said trip lever adapted to operate said clutch mechanism.

10. In a gear hobbing machine, the combination of cutting mechanism, a work saddle, manually operable means to move said saddle toward and away from the cutting mechanism, power operated means adapted to actuate said manually operable means comprising a clutch interposed between said power operated means and said manually operable means, said clutch comprising opposing toothed surfaces and having means to hold it frictionally in its engaged position, means interposed in the path of movement of said saddle to increase the resistance offered thereby to the operating mechanism, said clutch adapted to be automatically disengaged when the resistance offered by said saddle is so increased.

In testimony whereof I affix my signature, in presence of two witnesses.

FAY O. FARWELL.

Witnesses:
R. W. BOSSHART.
GLENN MUFFLY.